United States Patent
Bloy

(10) Patent No.: US 12,160,052 B2
(45) Date of Patent: *Dec. 3, 2024

(54) SYNCHRONOUS DUAL BAND SIGNAL ACQUISITION AND SOURCE LOCATION SYSTEM

(71) Applicant: RF Controls LLC, St. Louis, MO (US)

(72) Inventor: Graham P. Bloy, St Louis, MO (US)

(73) Assignee: RF Controls LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,519

(22) Filed: Jul. 7, 2023

(65) Prior Publication Data

US 2023/0352832 A1    Nov. 2, 2023

Related U.S. Application Data

(63) Continuation of application No. 17/006,025, filed on Aug. 28, 2020, now Pat. No. 11,728,568.

(51) Int. Cl.
| | |
|---|---|
| *H01Q 3/36* | (2006.01) |
| *G01S 5/04* | (2006.01) |
| *G08B 5/22* | (2006.01) |
| *G08B 13/14* | (2006.01) |
| *G08C 19/16* | (2006.01) |
| *H01Q 1/22* | (2006.01) |
| *H01Q 5/49* | (2015.01) |
| *H01Q 21/28* | (2006.01) |
| *H04B 1/00* | (2006.01) |
| *H04B 7/06* | (2006.01) |
| *H04B 7/185* | (2006.01) |
| *H04B 7/212* | (2006.01) |

(Continued)

(52) U.S. Cl.
CPC ............. *H01Q 3/36* (2013.01); *G01S 5/04* (2013.01); *G08B 5/22* (2013.01); *G08B 13/14* (2013.01); *G08C 19/16* (2013.01); *H01Q 1/2208* (2013.01); *H01Q 5/49* (2015.01); *H01Q 21/28* (2013.01); *H04B 1/005* (2013.01); *H04B 7/06* (2013.01); *H04B 7/0686* (2013.01); *H04B 7/185* (2013.01); *H04B 7/212* (2013.01); *H04J 4/00* (2013.01); *H04Q 5/22* (2013.01)

(58) Field of Classification Search
None
See application file for complete search history.

(56) References Cited

U.S. PATENT DOCUMENTS

| | | | | |
|---|---|---|---|---|
| 8,072,311 B2* | 12/2011 | Sadr | ............ | G01S 5/12 340/539.22 |
| 8,120,488 B2* | 2/2012 | Bloy | ............ | G06Q 10/087 340/572.1 |

(Continued)

*Primary Examiner* — Fekadeselassie Girma
(74) *Attorney, Agent, or Firm* — Lewis Rice LLC

(57) ABSTRACT

A dual band radio frequency signal acquisition and source location system, provided with a steerable phased array antenna operable in a first and a second radio frequency band. A digital signal processor electrically connected to the steerable phased array antenna is configured to control steering of an antenna beam of the steerable phased array antenna and apply frequency time division multiplexing to radio frequency signaling in the first and the second radio frequency bands. In particular, the first frequency band may be 2.4 GHz Bluetooth/Bluetooth Low Energy, and the second frequency band may be 900 MHz passive UHF RFID.

17 Claims, 6 Drawing Sheets

(51) Int. Cl.
*H04J 4/00* (2006.01)
*H04Q 5/22* (2006.01)

(56) References Cited

U.S. PATENT DOCUMENTS

| | | | | |
|---|---|---|---|---|
| 8,159,367 | B2* | 4/2012 | Hofer | G01S 13/825 |
| | | | | 342/51 |
| 8,326,217 | B2* | 12/2012 | Wahlberg | H04B 7/195 |
| | | | | 455/12.1 |
| 8,344,823 | B2* | 1/2013 | Bloy | H01Q 21/245 |
| | | | | 333/101 |
| 8,344,858 | B2* | 1/2013 | Bloy | G01S 13/76 |
| | | | | 343/702 |
| 8,421,631 | B2 | 4/2013 | Bloy et al. | |
| 8,493,182 | B2* | 7/2013 | Hofer | G01S 13/75 |
| | | | | 340/8.1 |
| 8,629,762 | B2* | 1/2014 | Sadr | G01S 13/878 |
| | | | | 340/539.22 |
| 8,659,430 | B2 | 2/2014 | Bloy et al. | |
| 8,690,057 | B2* | 4/2014 | Schoening | G06F 16/245 |
| | | | | 340/572.1 |
| 8,698,575 | B2 | 4/2014 | Bloy et al. | |
| 9,128,187 | B2* | 9/2015 | Kamaya | G01S 13/874 |
| 9,384,376 | B2* | 7/2016 | Sabesan | G06K 7/10346 |
| 9,472,075 | B1* | 10/2016 | Simon | G06K 7/0008 |
| 9,715,609 | B1* | 7/2017 | Fink | H01Q 25/00 |
| 9,747,480 | B2* | 8/2017 | McAllister | H01Q 11/08 |
| 9,883,337 | B2* | 1/2018 | Sadr | H04W 4/02 |
| 9,983,299 | B2* | 5/2018 | Sadr | G06K 7/10099 |
| 10,127,412 | B2* | 11/2018 | Sadr | G01S 5/145 |
| 10,405,184 | B2* | 9/2019 | Gallagher | H04W 4/021 |
| 10,797,381 | B2* | 10/2020 | DiFonzo | H01Q 1/246 |
| 10,954,003 | B2* | 3/2021 | Meek | B64G 1/1007 |
| 11,063,661 | B2* | 7/2021 | Rothaar | H04B 7/18541 |
| 11,728,568 | B2* | 8/2023 | Bloy | G01S 5/04 |
| | | | | 343/702 |
| 2001/0045494 | A1* | 11/2001 | Higgins | H04B 7/195 |
| | | | | 244/158.4 |
| 2010/0207738 | A1* | 8/2010 | Bloy | H01Q 3/36 |
| | | | | 342/368 |
| 2010/0219953 | A1* | 9/2010 | Bloy | G01S 13/872 |
| | | | | 705/28 |
| 2011/0032079 | A1* | 2/2011 | Bloy | H01Q 21/24 |
| | | | | 235/492 |
| 2011/0063113 | A1* | 3/2011 | Hook | G01S 13/82 |
| | | | | 340/572.1 |
| 2011/0090061 | A1* | 4/2011 | Hofer | G01S 3/46 |
| | | | | 340/10.3 |
| 2020/0278418 | A1* | 9/2020 | Lim | H04W 4/029 |
| 2021/0360413 | A1* | 11/2021 | Montalvo | G06N 5/04 |

* cited by examiner

SYNCHRONOUS DUAL BAND SIGNAL ACQUISITION AND SOURCE LOCATION SYSTEM

CROSS-REFERENCE TO RELATED APPLICATIONS

This application is a Continuation of U.S. Utility patent application Ser. No. 17/006,025 filed Aug. 28, 2020, the entire disclosure of which is herein incorporated by reference.

BACKGROUND OF THE INVENTION

Field of the Invention

The invention generally relates to Radio Frequency (RF) signal acquisition and source location. More particularly, the invention relates to Passive UHF RFID and Bluetooth/ Bluetooth Low Energy RF (BT/BLE) signal acquisition and source location, within a common target area, in three dimensions.

Description of the Related Art

Prior RF signal acquisition and source location systems, for example radio direction finding systems, typically operate on a triangulation basis, where location accuracy is dependent upon the number of signal reception points and their relative distance away from each other and the signal source. Signal interference and false reflected or pseudo emitters frustrate the use of radio finding systems in smaller target areas. Radio direction finding systems may also apply flight timing as a component of a signal source location system. However, especially when applied to relatively short distances, the accurate measurement of the associated flight times with the required resolution may be cost prohibitive.

U.S. Pat. No. 8,421,631, titled "Radio frequency signal acquisition and source location system", issued to Graham Bloy et al on 16 Apr. 2013, hereby incorporated by reference in the entirety, discloses passive UHF (for example 900 MHz) RFID location in three dimensions via steerable phased array antennas configured to scan a target area with an electrically steered interrogation beam to induce back scatter modulation self-identification signals from RFID in the target area. When a reply signal is received from an RFID, the vector of the interrogation signal applied which generates the best reply signal characteristics is recorded, enabling calculation of the RFID location.

U.S. Pat. No. 8,493,182, titled "Phase ranging RFID location system", issued to Graham Bloy et al on 23 Jul. 2013, hereby incorporated by reference in the entirety, discloses passive UHF RFID location in three dimensions via a single steerable phased array antenna, by utilizing phase ranging to calculate a location point of the received RFID reply signal(s), along the length of the interrogation beam vector. As RF signals encounter RF reflective surfaces, signal reflections therefrom may generate alternative signal paths for the same RF signal that then arrive at a receiver with common identifier data but from different directions and with varying signal characteristics. These pseudo emitters commonly described as "ghost signals" and/or general RF interference/noise that may be present complicate RF signal analysis/identification of the original signal(s) and thus the selection of the correct beam vector(s) for calculation of the RF signal location.

U.S. Pat. No. 8,659,430, titled "Radio frequency signal acquisition and source location system", issued to Graham Bloy et al on 25 Feb. 2014, hereby incorporated by reference in the entirety, discloses discrimination logic and target area scanning methodologies for identifying/separating pseudo emitters and resolving multi-path ambiguity issues arising therefrom.

Bluetooth (BT) is a wireless RF technology standard used for exchanging data between fixed and mobile devices over short distances using radio waves (2.4 GHz). Bluetooth Low Energy (BLE) is a wireless personal area network technology intended to provide considerably reduced power consumption and cost while maintaining a communication range similar to Bluetooth. Mobile operating systems including iOS, Android, as well as macOS, Linux and MS Windows, natively support Bluetooth Low Energy.

Bluetooth devices broadcast an inquiry response which may be monitored to collect the identity of the device and therefore by association the identity of the item and/or user to which the device may be attached. Prior Bluetooth location systems typically suffered the same inefficiencies and/or lack of accuracy as first-generation RF triangulation and/or portal RFID location systems.

Therefore, it is an object of the invention to provide a system and method(s) that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DESCRIPTION OF THE PREFERRED EMBODIMENT(S)

The inventor has recognized that real time location of RFID with respect to BT/BLE devices that may also be present within a target area 75 (see FIG. 6) enables efficient real-time direction of a user toward a specific RFID location and/or association of specific RFID with a user, for example when both are detected co-located and/or moving together in a common direction.

The inventor analyzed presently available signal acquisition and source location technology and recognized that a cost-effective solution was not available for synchronous three-dimensional RFID and BT/BLE signal location within a defined target area.

By utilizing Frequency and Time Domain Multiplexing (FTDM), the location of both passive RFID and BT/BLE signals may be efficiently derived for a common interrogation and reception RF signal beam angle/vector. Thereby, although the signaling at each of the RFID and the BT/BLE frequency bands are occurring at RF protocols and frequency bands that are separate and distinct from one another, interleaving (multiplexing) of the respective signals enables the resulting location information derived therefrom to be nearly simultaneous (real-time) for both types of RF signals.

Figure 1:
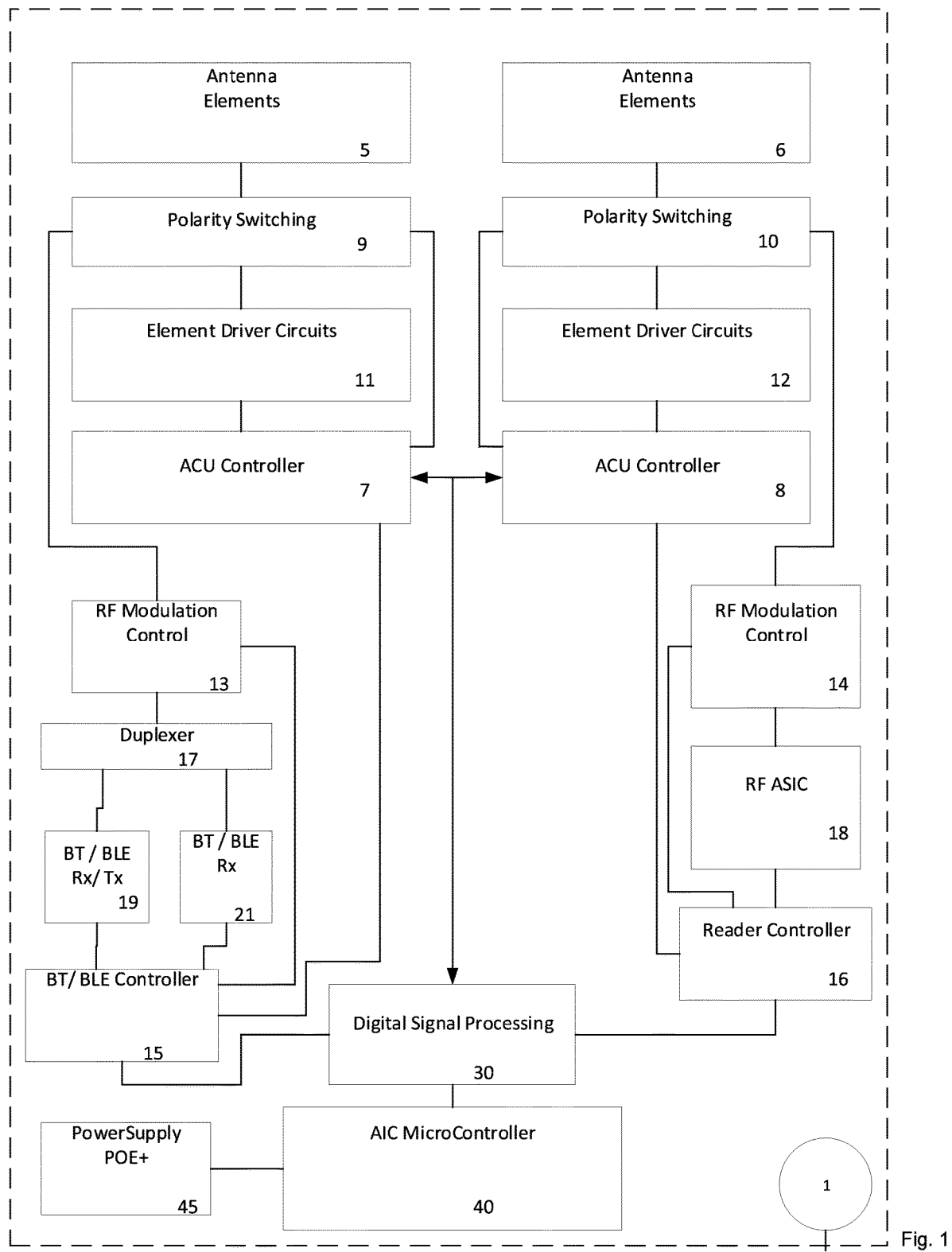
FIG. 1 is a schematic block diagram of an exemplary embodiment of a steerable FTDM antenna and source location module.
Figure 2:
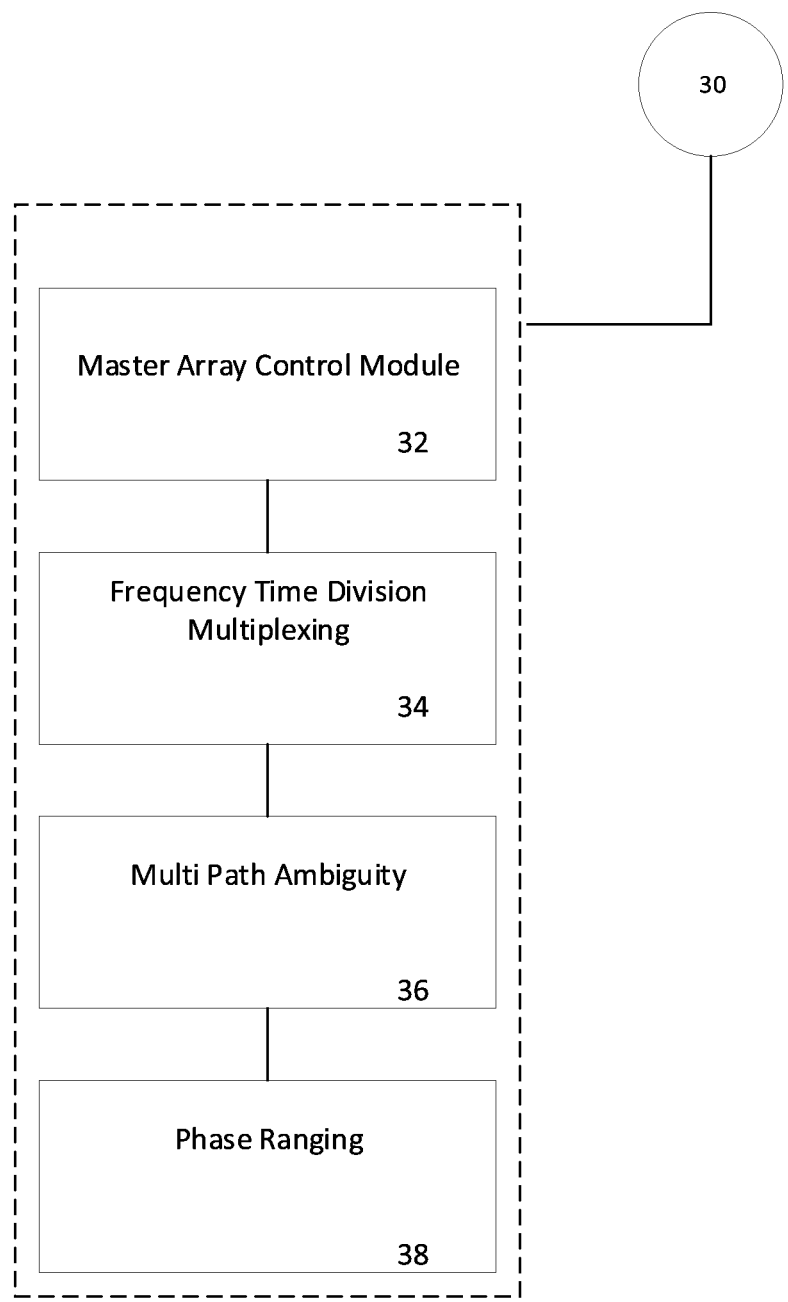
FIG. 2 is a schematic diagram of modules within the digital signal processor (DSP) of FIG. 1.

An exemplary block diagram for a steerable dual band RFID/BT FTDM antenna module 1 for a location system is shown in FIGS. 1 and 2. The FTDM antenna module 1 includes co-located arrays of antenna elements 5 and 6. Antenna elements 5 are dimensioned for a first frequency band, BT/BLE frequency bands (2.4 GHz), while Antenna elements 6 are dimensioned for a second frequency band, a passive UHF RFID frequency (such as 900 MHz).

Each of the antenna element 5 and 6 arrays are coupled to a respective Antenna Control Unit (ACU) Controller 7 and 8 operative to configure each antenna element with the correct polarity (polarity switching circuits 9 and 10) and/or power level (element driver circuits 11 and 12) for the current antenna beam angle/vector. Polarity switching circuitry may be applied, for example via circuitry as disclosed in U.S. Pat. No. 8,698,575, titled "Antenna switching arrangement", issued to Graham Blay on 1 Jan. 2013, hereby incorporated by reference in the entirety.

One skilled in the art will appreciate that the antenna elements, polarity switching and element driver circuits, under the control of an ACU controller, together comprise a steerable phased array antenna assembly that, although it may be entirely solid state, enables transmission/reception of RF signals focused along an antenna beam directable with precision and at high speed anywhere within a target area—without requiring conventional maintenance intensive electro-mechanical aiming apparatus. Thereby, high speed sweeps of an entire target area may be made repeatedly, recording any signals that may be present along with their time coded location(s) within the target area.

RF Modulation Controls 13 and 14 generate the respective desired frequency and general power level of the transmit signals delivered to the Antenna Elements 5, 6 under the control of respective BT/BLE controller 15 and Reader Controller 16, coordinated with the Antenna Control Unit (ACU) controllers 7 and 8.

BT/BLE protocol specific Duplexer 17 and BT/BLE Transceiver 19 and Receiver 21 modules are provided in-line between the BT/BLE controller 13 and the RF Modulation Control 14. The separate, always receiving, BT/BLE receiver 21 is tasked with listening broadly across the BT frequency bands, while the BT/BLE transceiver 19 operates on specific BT frequencies, enabling, for example, communications with individual BT signal sources that have been detected. The duplexer 17 shares the BT/BLE transceiver 19 and receiver 21 operations with the single RF Modulation control 13, to prevent cross-talk and/or mischaracterizing of BT/BLE transmissions by 19 that would otherwise be detected by the BT/BLE receiver 21.

Similarly, an RFID back scatter modulation specific RF ASIC 18, which controls RFID scan operations, is in line between the RF Modulation Control 14 and the Reader Controller 16.

The BT/BLE controller 15 drives both the RF Modulation Control 13 and ACU Controller 7 and is itself controlled by a Digital Signal Processor (DSP) 30. Similarly, the DSP 30 also controls the Reader controller 16 and the corresponding ACU Controller 8.

One skilled in the art will appreciate that the BT/BLE controller 15 and the reader controller 16, and their respective upstream transceivers and steerable phased array antenna components together enable dual radio frequency band operation of RF signal communication and location operations at both separate frequency bands and different RF modulation protocols under the master control of a common DSP 30. Via this common control, it is possible to implement Frequency Time Division Multiplexing upon RF signaling occurring on each of the dual radio frequency bands.

As best shown in FIG. 2, the DSP 30 has numerous function and calculation functionalities. Operating as the Master Array Control Module (MACM) 32, the DSP 30 is operative as the local processor/coordinator of signal generation, Antenna aiming, FTDM interrogation modulation, and received signal designation and location. The DSP 30 performs multiple functions in addition to Master Array Control. The DSP 30 coordinates the FTDM functionality of directing the BT/BLE Controller 15 and Reader controller 16 to interleave their respective transmit functions. Also, the DSP 30 performs the local calculations for solving multi path ambiguity and rendering location solutions for three-dimensional signal location via phase ranging. The DSP 30 is enabled by and passes signal location data back to downstream systems via an Antenna Interface Controller (AIC). The AIC 40 may be powered by, and feed power forward into the FTDM antenna module 1 for example via a power supply 45 that may utilize, for example, power over ethernet plus (POE+). A common power supply 45 may also power multiple other steerable FTDM antenna modules 1 that may be present in the installation.

In a typical installation, one or more Steerable FTDM antenna modules 1, for example as shown in FIG. 1, are controlled and monitored by a central computer resource running a program/operating system (OS). The OS coordinates communications connections with the FTDM antenna modules 1, for example via Transmission Control Protocol (TCP) or the like. Once connected, the operating system configures a coordinated sweep process between the antenna modules. Antennas are configured through the OS system by assigning them the physical areas that each individual antenna will monitor. These areas are divided into sweep points that will be sent to each antenna during antenna setup along with additional configuration settings. After the antenna is configured, OS will instruct it to start the sweep process.

Via the BT/BLE and Reader controllers 15 and 16, and associated transceiver and antenna elements described herein above, the steerable FTDM antenna module(s) 1 are capable of operation in first and second (two) frequency bands. The first being, for example, 900 MHz for Passive UHF RFID and the second, for example, 2.4 GHz for BT/BLE.

The Frequency and Time Division Multiplexing (FTDM) 34 module of the DSP 30 interleaves the transmit portion of signal location sweeps for both frequency bands, preferably while the antenna is electrically aimed to transmit/receive along the same beam vector. The FTDM functions are processed by an FTDM module 34 which controls each of the radios via the MACM 32.

The primary function of the FTDM module 34 is to control the operative frequency within each frequency band, which in this instance would be the 900 MHz and 2.4 GHz RF receive and transmit signals. While both arrays are always receiving, they never operate in transmit mode at the same time. Hence, while the 900 MHz transmitter is transmitting the 2.4 GHz transmitter is not and vice versa.

The determination of transmission from the arrays in either band is determined by the MACM 32. This module culminates data from both arrays and is controlled in part via the user interface which determines which mode the array is set to operate. The two arrays interleave their transmit time according to user requirements and/or tag (900 MHz) or beacon (2.4 GHz) density. The FTDM module 34 calculates the time sequencing that is required to allow both arrays to function within specified limits and parameters. The FTDM module 34 receives input from the ACU controllers 7 and 8 via the MACM 32 to determine and control array operation.

For example, with respect to the RFID inventory scans by the Reader Controller 16 and RF ASIC 18 and BT/BLE scans by the BT/BLE Controller 15 and the BT/BLE Transceiver 19 and Receiver 21, while an RFID scan at a first sweep point occurs for 35-200 mS, the BT/BLE Transceiver 19 is preparing the next steer Angle and Processes BT/BLE singulation data. While the Reader Controller 16 and RF Asic 18 prepare for the next steer angle and process tag report data, a BT/BLE scan is made (35-100 mS). Then, the sequence repeats. Notably, while the BT/BLE Transceiver 19 is cycling on and off opposite RFID inventory scans of the Reader Controller 16, the BT/BLE Receiver 21 may listen/scan at all times when the steer angle has been set, see Table 1 here below.

TABLE 1

| RF Inventory Operations | Rf-Tag Inventory Scan at sweep Point 35-200 mS | Prepare Next Steer Angle and process Tag Report Data | Rf-Tag Inventory Scan at sweep Point 35-200 mS | Prepare Next Steer Angle and process Tag Report Data |
|---|---|---|---|---|
| BT/BLE Tx/Rx Module Operations | Prepare Next Steer Angle and Process BT/BLE Singulation data | BT/BLE Scan 35-100 mS | Prepare Next Steer Point and Process BT/BLE Singulation data | BT/BLE Scan 35-100 mS |
| BT/BLE Rx Module Operations | After Next Steer Angle Setup is complete Scan BT/BLE Data | Continue Scan BT/BLE Data | After Next Steer Angle Setup is complete Scan BT/BLE Data | Continue Scan BT/BLE Data |

This generates a continuous transmission timing as follows (Table 2):

TABLE 2

| RF Tag Inventory | BT/BLE Scan | RF Tag Inventory | BT/BLE Scan | ... |
|---|---|---|---|---|
| 20-200 mS | 35-100 mS | 20-200 mS | 35-100 mS | ... |

Because the scanning in each band is operative about a common beam vector, with the scan of each band occurring at most approximately 200 mS or so apart, while any movement of the signal sources within the target area 75 is likely to be relatively slow, the resulting signal locations from each frequency band for the same target area 75 may be treated as essentially simultaneous.

There are two primary modes of operation for the array that are controlled and preset via the user input. Autonomous mode and manual mode. In autonomous mode, the arrays will work within a preset set of user parameters, e.g. sweep times, scan points, scan area, etc. The 900 MHz array and the 2.4 GHz array can be independently set up to operate with separate parameters. This mode is controlled via the MACM 32 and the FTDM module 34. In this mode both arrays will be operating simultaneously in receive and transmitting at either 900 MHz or 2.4 GHz as determined by the Frequency and Time sequencing supplied via the FTDM module 34 controller.

In manual mode, one array is off while the other operates. This is a user defined sequence, the arrays can be set to alternate operation, e.g. the RFID 900 MHz array will operate for a determined time then switch over to the 2.4 GHz BT/BLE array for a determined time. The FTDM module 34 controller is still operational in this process and monitors, limits and sets parameters via the MACM 32.

Once the sweep process has been initiated, the OS will then start monitoring the antennas for status and Tag reports. The "Antenna Interface Controller" (AIC) 40 is the firmware module that handles all communication between the DSP 30 and the OS.

During operation, the aiming and transmit/receive data is distributed to and received from the respective antenna modules by the MACM 32. Upon connection, the AIC 40 stores all the sweep points and verifies that the respective BT/BLE controller 15 and Reader Controller 16 and all other components of the system are communicating with each other, the RF modulation Control 13 and 14 are turned on, and the unit is able to sweep. After the sweep start command is received, the AIC 40 is tasked with sending the MACM 32, and therethrough the BT/BLE Controller 15 and Reader Controller 16 the sweep points, defining a plurality of steps through the sweep of the target area 75, and RF Power levels determined by OS and/or MACM 32. The AIC 40 is responsible for determining and/or distributing sweep data, such as the max Power Level for a particular steer angle, the Power Adder for a particular angle, and/or a calibrated offset value to produce the best VSWR for each sweep point. The AIC 40 will send two additional sweep points down to a Reader buffer to enable continuous sweeping. The AIC 40 will await a message from the BT/BLE controller 15 and Reader Controller 16 when that inventory point is complete at which time the AIC 40 will then send down the next sweep point.

The reader controller 16, interfaced to MACM 32, controls the actual RF reading of tags and makes sure that the antenna is properly steered through each of a plurality of steps through the sweep of the target area 75. Upon receiving a sweep point, the reader controller 16 will send the steer angle to the ACU Controller 8 so it can set up the steer. The Reader Controller 16 sends a number of steer angles into the buffer of the ACU Controller 8 so the calculations can be ready for the next point. The Reader Controller 16 will then set up the RF ASIC 18 for a frequency determined by the frequency hopping routines and all other tag inventory settings. The Reader controller 16 also instructs the RF Modulation control 14 to control the power level requested in the sweep point. The Reader Controller 16 will then enable the RF modulation control 14 to turn RF power on and after power stabilizes will measure RF power levels and perform any tune adjustment needed to attain best reflected power at that steer angle. While the Reader Controller 16 and corresponding antenna elements are being configured, The BT/BLE Controller 15 receives the same sweep point and performs a corresponding configuration with respect to RF Modulation control 13 and ACU 7. After the power has been up for a pre-determined time and all adjustments are made, an inventory round may be initiated. All tag and BT/BLE signal data collected during an inventory round may be sent back to the AIC 40 which in turn sends it down to the OS for location processing. Alternatively, location processing may be performed by the DSP 30, utilizing the Multi-Path Ambiguity module 36 and Phase Ranging module 38 so that located rather than bulk signal data is sent to the OS.

The ACU controllers 7 and 8, controlled by MACM 32 receives the steer angles from the respective BT/BLE and Reader controllers 15 and 16. The ACU controllers 7 and 8 will generate the appropriate values from the calibrated Element Data to produce the steer angle desired. The ACU 7 and 8 also sets the polarity switches for the current steering point as determined by the current sweep point. When the message comes from the reader that it is ready for the next steer angle, the ACU Controller 7 and 8 will drive the Element Driver circuits 11 and 12 to those settings to produce the proper steering of the Antenna Elements 5 and 6. Multiple ACU controllers may be connected to the same controller to produce antennas with different steering characteristics.

After the Inventory round is complete, the next steer point is loaded and the process repeats.

Metallic surfaces and the like within the target may operate as reflectors of the various response signals, generating numerous pseudo emitters that can potentially result in erroneous three-dimensional signal origin location designations. To improve signal discrimination, a multi-path ambiguity logic may be applied by the DSP Multi Path Ambiguity module I or OS processor to filter the signal data records between actual signal(s) and pseudo emitters.

Figure 3:
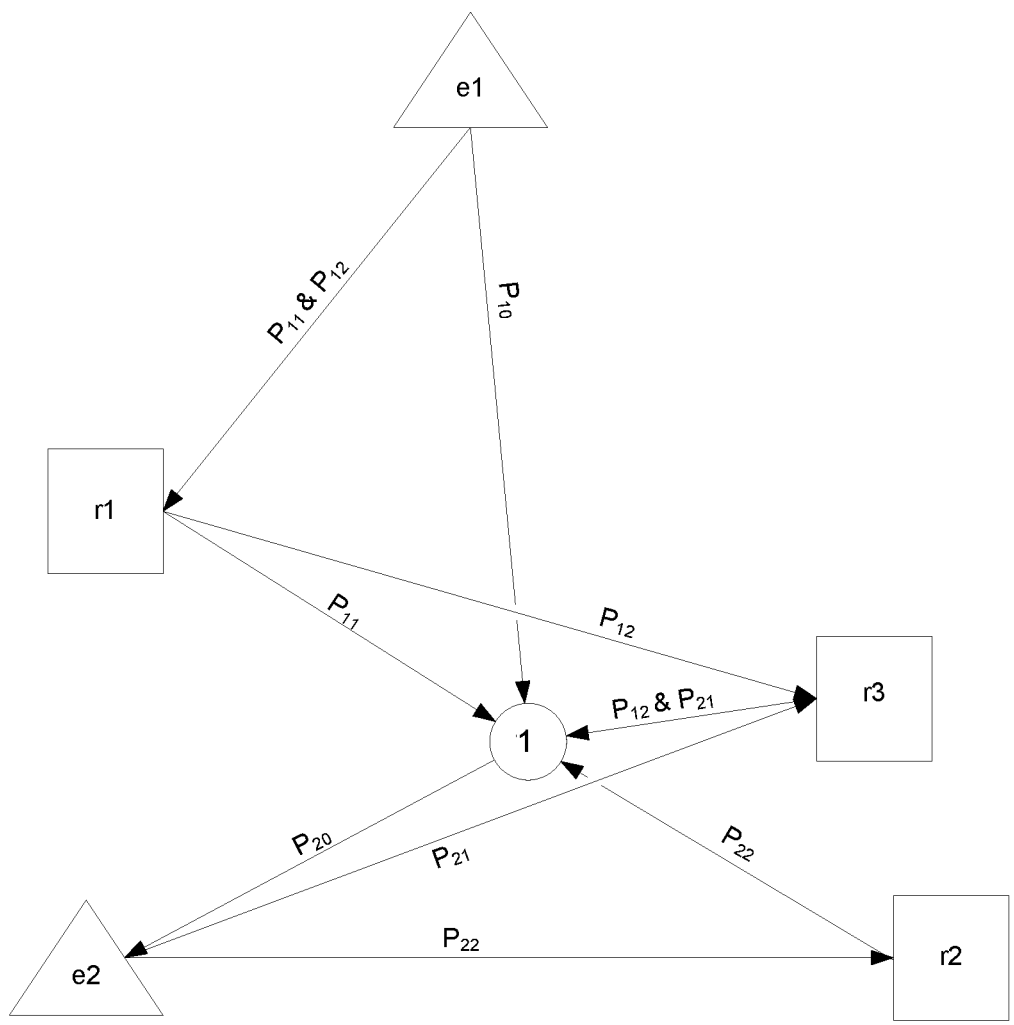
FIG. 3 is a schematic signal path diagram, demonstrating actual and pseudo emitters.

FIG. 3 demonstrates how two signal(s) e1 and e2 can each generate multiple pseudo emitters received by the antenna, some of these different signals, from the FTDM antenna module 1 frame of reference, appearing to originate from a common location r3. Reflectors in the reception zone of the antenna generate pseudo emitters along paths p11, p12, p21 and p22. Checking the signal identification of the received signals can differentiate between separate signal sources. Because a reflected signal path will always be longer than the single direct path (P10 or P20) between the respective signal source (E1 or E2) and the FTDM antenna module 1, a check of the received signal strength indicator of the response signals with a common signal identification can be used to identify an actual signal from a plurality of pseudo emitters, the response signal having the highest response signal strength indicator being the actual signal. Signals identified as pseudo emitters may be discarded, leaving a single signal data record for each actual signal identification.

Figure 4:
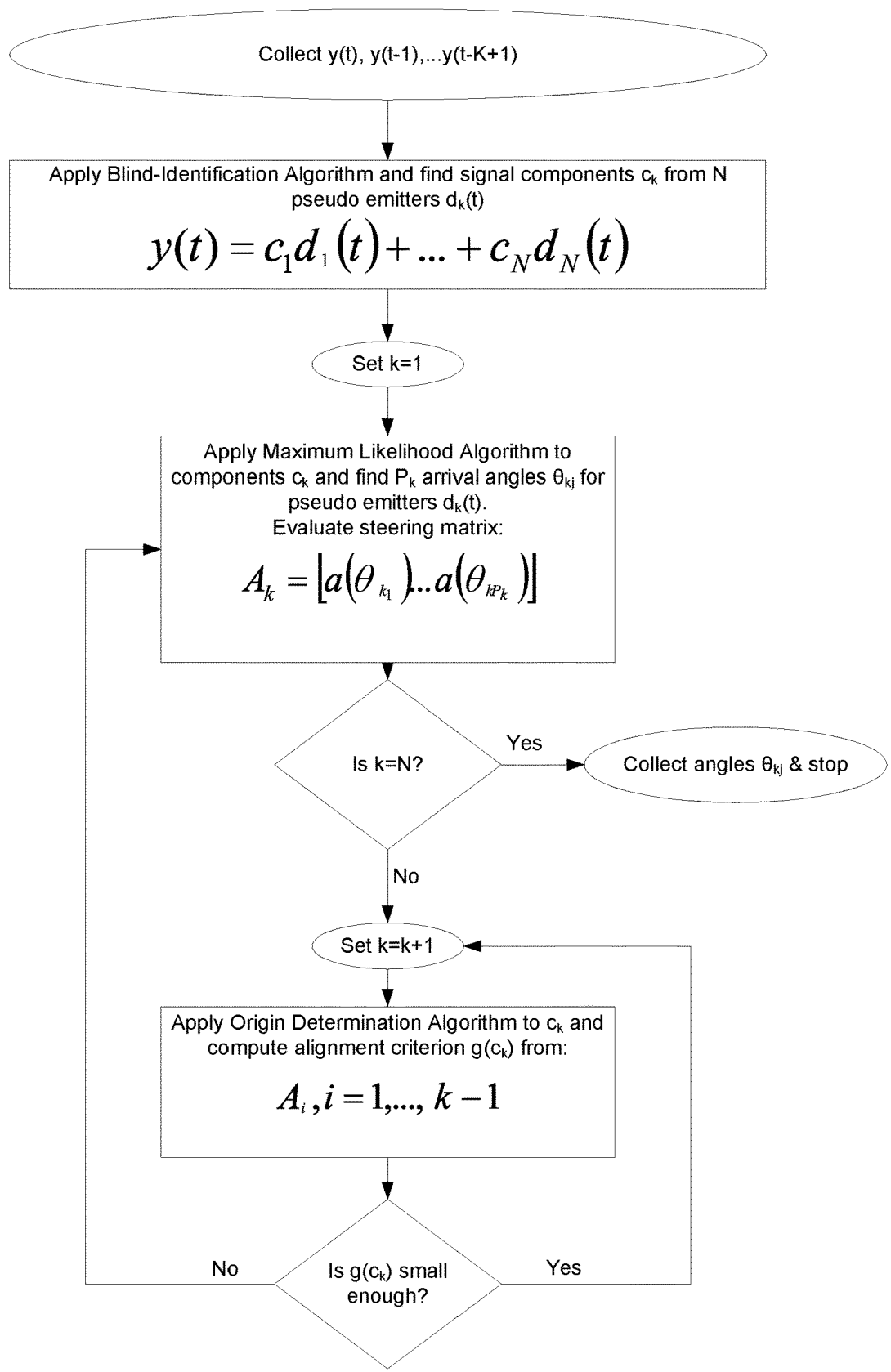
FIG. 4 is a flow chart diagram demonstrating a multi-path ambiguity resolution logic.

Alternatively, the discrimination logic may employ a multi-path ambiguity resolution logic (MPAL) as shown in FIG. 4 (the notations following a "^" representing superscript notations). The MPAL accesses a collection of received response signal(s) and converts each of them to a complex envelope, the collection represented as $y(t)$, $y(t-1), \ldots, y(t-K+1)$. A Blind-Identification Logic is then applied to identify signal components $c^k$ from N pseudo emitters $d^k(t)$: $y(t)=c^1 d^1(t)+ \ldots +c^N d^N(t)$. Then, for each of k=1 to k=N, a Maximum Likelihood Logic is applied to $c^k$ to find Pk arrival angles $(theta)^{kj}$ for pseudo emitter $d^k(t)$, which can then be applied to a steering matrix: $A^k=[a((theta)^{k1})) \ldots a((theta)^{kPk})]$. An origin determination logic upon $c^k$ then computes an alignment criterion $g(c^k)$ from $A^I$, $1=1, \ldots, k-1$, the origin determination logic continuing to increment k until $g(c^k)$ is larger than a predefined probability factor. When k=N, the angles $(theta)^{kj}$ are collected and the MPAL is completed.

To obtain higher resolution points proximate a likely response signal location, the beam sweep rate and or increment may be adjusted to increase the residence time at a particular RF signal direction of interest. For example, when a response signal is detected, the next scan increment may be reduced and the residence time increased. Similarly, where no response signal has been detected, the scan increment may be increased and the dwell time reduced until a further response signal is detected. Further, as multiple scans are completed, the approach towards areas of the previous scan that had response signal activity may initiate similar sweep increment reductions and scan dwell time increases to attempt to identify with greater resolution the specific bounds of the scan that indicate specific signal identification response signal activity. By focusing on identified areas of signal activity and less upon areas of no or rare activity, the overall scan rate may be maximized. To reduce the load these types of logic operations may apply to the local processor and data storage bandwidth they may be placed at the OS, if present.

Figure 5:
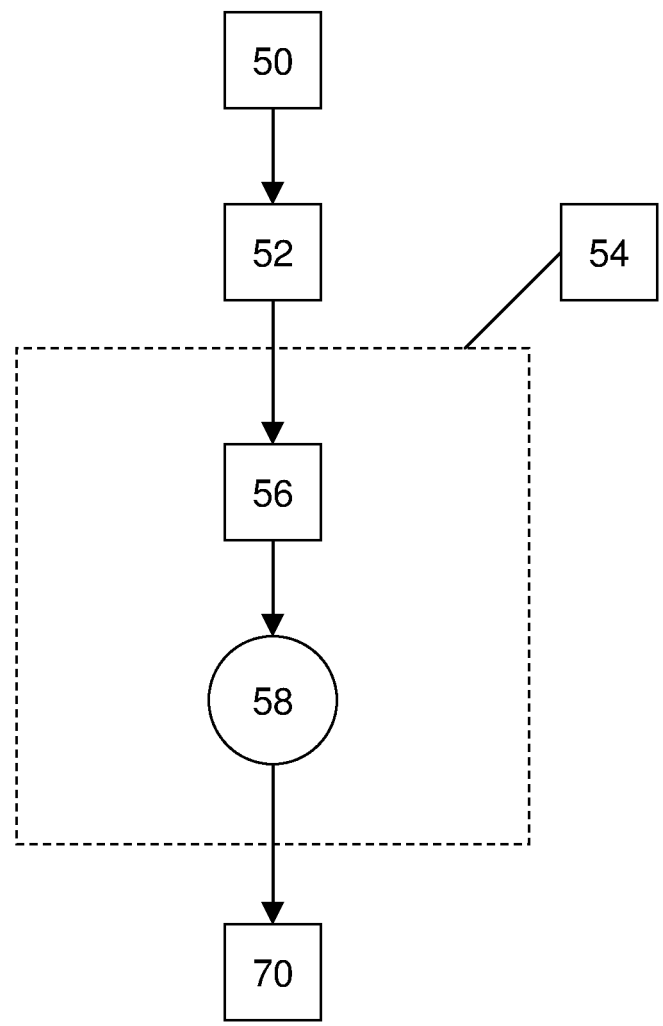
FIG. 5 is a schematic process diagram for phase ranging.

Phase ranging identifies a signal's location along a beam vector via the method steps shown in FIG. 5. At 50, a plurality of data set(s) are gathered by directing the antenna beam through a scan of the target area. The scan may be for example a raster scan or other sweep pattern, for example prioritized by prior data identifying the locations of signals. The scan may be performed at a single scan frequency, interrupted upon reception of a reply or beacon signal, whereupon a plurality of readings are repeated over a range of different frequencies along the same beam direction. Alternatively, the scan may be performed with continuous frequency hopping, enabling application of maximum signal strength with applicable governmental RF transmitter regulations. To apply phase ranging to the received signal data, for a beam direction at which a signal has been detected, the beam extent or a shorter segment of interest of the beam extent at the instant direction is derived, at 52.

Figure 6:
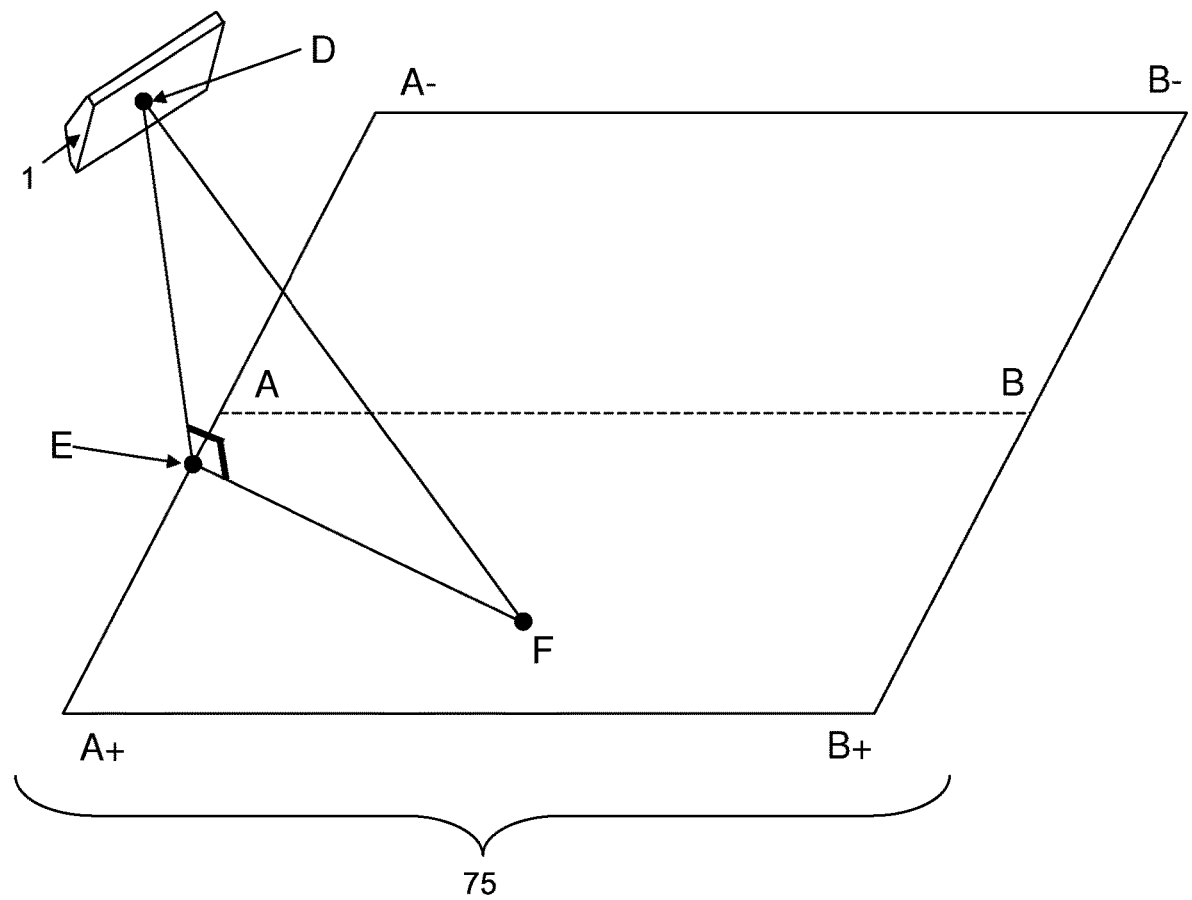
FIG. 6 is a schematic diagram demonstrating a beam extent within a volume perimeter.

In a typical installation, as shown for example in FIG. 6, a perimeter of the target area 75 is specified and the position of the antenna with respect to the target area 75 is also known. For any beam angle the intersection of the beam with the perimeter of the target area 75 such as the floor and/or sidewalls may be calculated by trigonometry. The floor and/or sidewalls may be physical or logical portions and/or barriers, including for example the perimeter of desired exclusion area(s) from which it is known that signals will be excluded and/or that identify locations wherein signal tracking is not desired.

Once the co-ordinates of the endpoint of the beam have been calculated, the beam length may also be calculated. For example, as shown in FIG. 6, when the beam is swept in azimuth A− to A+ (i.e. from left to right) and successively moved in elevation towards B, a raster scan of the floor covering a volume defined by A−, A+ to B−, B+ is performed. At any instance during the scan a right angle triangular figure may be drawn comprising a vertical line from a point D at the center of the antenna dropping perpendicular to the floor to point E, a line running from D to a point of intersection with the floor F representing the center of the antenna interrogation beam, and a horizontal line along the floor connecting E and F. As the beam is swept across the floor the length of the line DF, the beam extent, will vary as will the included angle of intersection DF and EF.

The ends of the beam extent identified at 52 may be referenced as MIN and MAX, representing the minimum distance and the maximum distance, respectively, that the present signal is expected to be from the antenna, along the present beam direction.

Further refinements may be applied that reduce overall processing times and also improve noise immunity. For example, the distances of MIN and MAX may be reduced to a high probability range by utilizing signal timing and/or Return Signal Strength Indication (RSSI) data of the data sets to reduce the theoretical length of the beam extent. If signal timing indicates a short or long period between launch of the interrogation signal and reception of a reply signal a segment of the beam extent closer and/or farther away from the antenna may be prioritized for examination. Similarly, if the RSSI reading is higher and/or lower, this may be interpreted as an indication that the range of possible locations of the target RFID along the signal beam is closer and/or farther away.

Phase ranging along the beam extent is performed at 54. Because the tag distance from the antenna along the signal beam is not known to begin with, an arbitrary distance is assumed, such as the MIN, MAX, a midpoint or other function of the present beam extent. In this example, an exemplary distance of MIN=10 feet is selected. As output by the RF Modulation Control E2, for example, the recorded phase information is the modulus of 180 degrees. As the data set(s) are plotted with respect to phase and frequency, it will be noticed that there are three lines of data spaced 180 degrees apart at their origin. This is because, the phase is recorded with reference to the initial frequency phase result and subsequent phase measurements are adjusted by adding or subtracting multiples of 180 degrees if they deviate from the theoretical phase (see below) by more than 90 degrees. Thereby, the phase is adjusted so that the result best agrees with the theoretical phase reading.

Theoretical phase=phase at min Freq−(freq (Hz)−
min Freq)*distance (ft)*360 (deg)/c(ft/s)*2

At 56, the signal processor generates a theoretical dataset comprising the phase of a, for example, backscatter signal for each frequency and for a set of theoretical tag distances in the range of MIN to MAX. This theoretical line, data points calculated for example by calculating theoretical phase for a range of distances is shown in FIG. 4 for the assumed tag distance of 10 feet. It will be noticed that the theoretical line has a different slope than the actual phase measurements of the tag. The origin of the theoretical line may be selected as the first phase versus frequency data set co-ordinates taken so that the origins of the actual raw data and the theoretical lines coincide, which simplifies calculations.

At 58, the signal processor performs an iterative loop on the data set(s) of each detected RFID tag in order to determine a best fit to the theoretical phase, which identifies the distance of the RFID tag along the signal beam from the antenna. Instead of calculating the theoretical distance/overlay slope differential associated with each available frequency data set in sequence, comparisons between representative theoretical distances corresponding to the available range of frequency data sets(s) may be made to identify a converging theoretical distance range of interest, for example via slope comparison and/or plus/minus indication of the slope differential from the theoretical result for the associated distance, wherein the available frequency data set(s) within the converging theoretical distance range are then reviewed for best fit.

The iterative loop generates the theoretical line with respect to each of a number of distances between MIN and MAX. If the actual distance is greater than the theoretical distance, then the slope of the recorded data will be greater than the theoretical and if the actual distance is less than the theoretical distance, then the slope will be less (more shallow) than the theoretical.

The recorded data is then overlaid on the theoretical data for each distance step. At some distance the slope of the recorded data and the slope of the theoretical data will at least be parallel and will typically coincide provided that the origins of both are the same. At 70, the theoretical distance with the best slope fit is selected as the output distance.

In a refinement of the iterative method to speed up the location process, a converging iterative process may be used whereby the theoretical distance is first calculated for a distance less than the assumed distance of the tag and then for a distance greater than the assumed distance of the tag. By comparing the slopes of the data set between the measurements, it is possible to exclude numerous data set calculations and rapidly converge on the actual distance using known mathematical techniques.

One skilled in the art will recognize that the present inventions enable three-dimensional location of signals utilizing highly reliable, cost efficient, static solid-state equipment. The invention provides direction and velocity tracking, useful for example to identify movement of targets into areas where additional actions may be desired, such as user access, process control, inventory control and or theft prevention. Applied to both BT/BLE and passive UHF RFID technology, the present invention enables new utilities and data associations between users, for example human users associated with the BT/BLE signals of their cellular telephones/portable electronic devices, and tagged inventory that the prior gateway based general presence indication systems could not begin to suggest.

| Table of Parts | |
|---|---|
| 1 | FTDM Antenna module |
| 5 | Antenna element |
| 6 | Antenna element |
| 7 | Antenna control unit controller |
| 8 | Antenna control unit controller |
| 9 | Polarity switching circuit |
| 10 | Polarity switching circuit |
| 11 | Element driver circuit |
| 12 | Element driver circuit |
| 13 | RF modulation control |
| 14 | RF modulation control |
| 15 | BT/BLE controller |
| 16 | Reader Controller |
| 17 | Duplexer |
| 18 | RF ASIC |
| 19 | BT/BLE Transceiver |
| 21 | BT/BLE Receiver |
| 30 | Digital Signal Processor |
| 32 | Master Array Control Module |
| 34 | Frequency Time Division Multiplexing Module |
| 36 | Multi Path Ambiguity Module |
| 38 | Phase ranging module |
| 40 | Antenna Interface Controller |
| 45 | Power supply |
| 75 | Target area |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A method for synchronous dual band radio frequency signal acquisition and source location, the method comprising:
providing a dual band radio frequency signal acquisition and source location system including:
a steerable phased array antenna operable in a first and a second radio frequency band; and
a digital signal processor electrically connected to the steerable phased array antenna;
defining a target area;
sweeping the target area with the antenna beam while frequency time division multiplexing radio frequency signal transmissions in the first and the second radio frequency bands while the antenna beam is at each of a plurality of sweep steps through the sweep.

2. The method of claim 1, wherein signal data obtained at each sweep step is provided to the digital signal processor for signal location.

3. The method of claim 2, wherein signals from one or more pseudo emitters are filtered via a multipath ambiguity module of the digital signal processor.

4. The method of claim 3, wherein a location of a signal along the antenna beam is calculated by a phase ranging module of the digital signal processor.

5. The method of claim 1, wherein signal data obtained at each sweep step is provided to an antenna interface controller electrically connected to the digital signal processor for transmission out of the system.

6. The method of claim 1, wherein the radio frequency signaling in the first radio frequency band is Bluetooth and/or Bluetooth Low Energy protocol and the radio frequency signaling in the second radio frequency band is back scatter modulation protocol for passive RFID.

7. The method of claim 6, wherein the Bluetooth/Bluetooth Low Energy signaling is associated with a portable electronic device of a human user.

8. The method of claim 6, wherein the dual band radio frequency signal acquisition and source location system further includes:
a Bluetooth/Bluetooth Low Energy controller electrically connected to the digital signal processor;
a Bluetooth/Bluetooth Low Energy transceiver and a Bluetooth/Bluetooth Low Energy receiver electrically coupled between the Bluetooth/Bluetooth Low Energy controller and a duplexer; and
an RF modulation control electrically connected between the steerable phased array antenna and the duplexer.

9. The method of claim 6, wherein the dual band radio frequency signal acquisition and source location system further includes:
a reader controller electrically connected to the digital signal processor; and
an RF ASIC and an RF modulation control electrically connected between the steerable phased array antenna and the reader controller.

10. The method of claim 1, wherein: the frequency time division multiplexing of radio frequency signaling in the first and the second frequency bands is operative only upon the transmission of radio frequency signals, the frequency time division multiplexing configured to alternate radio frequency signal transmissions within each of the first and second frequency bands so that radio frequency signal transmission only occurs in one of the first and the second frequency bands at a time.

11. A dual band radio frequency signal acquisition and source location system, comprising:
a steerable phased array antenna operable in a first and a second radio frequency band; and
a digital signal processor electrically connected to the steerable phased array antenna;
the digital signal processor configured to:
control steering of an antenna beam of the steerable phased array antenna;
apply frequency time division multiplexing to radio frequency signaling in the first and the second radio frequency bands.

12. The dual band radio frequency signal acquisition and source location system of claim 11, wherein the radio frequency signaling in the first radio frequency band is Bluetooth and/or Bluetooth Low Energy protocol and the radio frequency signaling in the second radio frequency band is back scatter modulation protocol for passive RFID.

13. The dual band radio frequency signal acquisition and source location system of claim 11, wherein the first radio frequency band is 2.4 Ghz and the second radio frequency band is 900 Mhz.

14. The dual radio frequency signal acquisition and source location system of claim 1, wherein the frequency time division multiplexing is configured to operate upon an antenna beam with a common directional angle for both of the first and the second frequency bands.

15. The dual band radio frequency signal acquisition and source location system of claim 11, wherein the steerable phased array antenna includes a first array of antenna elements dimensioned for operation in the first radio frequency band and a second array of antenna elements dimensioned for operation in the second radio frequency band.

16. The dual band radio frequency signal acquisition and source location system of claim 15, further including:
a first antenna control unit controller electrically connected to the digital signal processor; and
a first element driver circuit and a first polarity switching circuit electrically connected inline between the first antenna control unit controller and the first array of antenna elements.

17. The dual band radio frequency signal acquisition and source location system of claim 11, further including an antenna interface controller electrically connected to the digital signal processor; the antenna interface controller configured to transmit data to and receive instructions from outside of the dual band radio frequency signal acquisition and source location system.

* * * * *